(12) United States Patent
Shen-Orr et al.

(10) Patent No.: US 9,366,718 B2
(45) Date of Patent: Jun. 14, 2016

(54) DETECTION OF DISASSEMBLY OF MULTI-DIE CHIP ASSEMBLIES

(71) Applicant: CISCO TECHNOLOGY, INC., San Jose, CA (US)

(72) Inventors: Chaim D. Shen-Orr, Haifa (IL); Lior Amarilio, Yokneam (IL); Uri Bear, Pardes-Hana (IL)

(73) Assignee: Cisco Technology Inc., San Jose, CA (US)

( * ) Notice: Subject to any disclaimer, the term of this patent is extended or adjusted under 35 U.S.C. 154(b) by 71 days.

(21) Appl. No.: 14/025,237

(22) Filed: Sep. 12, 2013

(65) Prior Publication Data
US 2015/0072447 A1    Mar. 12, 2015

(51) Int. Cl.
*G01R 31/26* (2014.01)
*H01L 21/66* (2006.01)
(Continued)

(52) U.S. Cl.
CPC ............ *G01R 31/2644* (2013.01); *G06F 21/86* (2013.01); *H01L 22/14* (2013.01); *H01L 23/576* (2013.01); *H01L 25/0652* (2013.01); *H01L 2924/0002* (2013.01)

(58) Field of Classification Search
CPC ............................. G06F 17/5045; H04L 9/002
USPC ................................................ 438/17; 726/34
See application file for complete search history.

(56) References Cited

U.S. PATENT DOCUMENTS 4,514,647 A * 4/1985 Shoji ................... G06F 13/4217
327/161
6,355,501 B1  3/2002 Fung et al.
(Continued)

FOREIGN PATENT DOCUMENTS

DE WO2012123400 * 3/2012
DE WO2012123400 * 9/2012
(Continued)

OTHER PUBLICATIONS

Maiti, "Improved Ring Oscillator PUF: An FPGA-friendly Secure Primitive", 2010, Journal of Cryptography, p. 375-397.*
(Continued)

*Primary Examiner* — David Pearson
*Assistant Examiner* — Gregory Lane
(74) *Attorney, Agent, or Firm* — Hahn Loeser & Parks, LLP

(57) ABSTRACT

A multi-die chip assembly is described, the multi-die chip assembly including at least one detection apparatus which detects manipulations of the multi-die chip assembly, the detection apparatus including a distributed circuit including a circuit whose elements are distributed among those dies which include the elements of a local reference circuit, the distributed circuit including a free running clock, at least one local reference circuit disposed in at least one die of the multi-die chip assembly, each of the local reference circuits including a free running clock, and at least one non-volatile memory, in which is stored during manufacture of the multi-die chip assembly, an allowed range of a result of a function having at least two arguments for each reference circuit a value of the frequency of the local reference circuit as manufactured, and a value of the frequency of the distributed circuit as manufactured, at least one element of the plurality of memories being disposed in each die including the elements of the local reference circuit. Related methods, apparatus, and systems are also described.

19 Claims, 5 Drawing Sheets

(51) Int. Cl.
*G06F 21/86* (2013.01)
*H01L 23/00* (2006.01)
*H01L 25/065* (2006.01)

(56) References Cited

U.S. PATENT DOCUMENTS

| | | | |
|---|---|---|---|
| 2007/0083767 | A1 | 4/2007 | Kumamoto |
| 2010/0031065 | A1* | 2/2010 | Futa et al. .................... 713/194 |
| 2010/0213951 | A1 | 8/2010 | Lewis |
| 2011/0055649 | A1* | 3/2011 | Koushanfar et al. .......... 714/729 |
| 2011/0193596 | A1* | 8/2011 | Shibayama ............... G06F 1/06 327/115 |
| 2013/0019324 | A1* | 1/2013 | Tehranipoor et al. ........... 726/34 |
| 2013/0106461 | A1* | 5/2013 | Ficke ...................... G06F 7/588 326/8 |
| 2013/0141137 | A1* | 6/2013 | Krutzik et al. ..................... 326/8 |
| 2013/0194886 | A1* | 8/2013 | Schrijen et al. ............... 365/226 |
| 2014/0108786 | A1* | 4/2014 | Kreft ............................ 713/156 |

FOREIGN PATENT DOCUMENTS

| | | |
|---|---|---|
| EP | 2 320 344 A2 | 5/2011 |
| WO | WO 2011/086051 A1 | 7/2011 |

OTHER PUBLICATIONS

Ted Huffmire et al., "Hardware trust implications of 3-D integration," *Proceedings of the 5th Workshop on Embedded Systems Security (WESS '10)* (Oct. 24, 2010).

Abhranil Maiti et al., "Improving the Quality of a Phyhsical Unclonable Function Using Configurable Ring Oscillators," *19th International Conference on Field Programmable Logic and Applications (FPL 2009)*, pp. 703-707 (IEEE Sep. 2009).

G. Edward Suh et al., "Physical unclonable functions for device authentication and secret key generation," *Proceedings of the 44th annual Design Automation Conference (DAC '07)* (Jun. 8, 2007).

"3D—Through Silicon Via (TSV) Water Finishing & Flip Chip Stacking Solutions" (Amkor Technology) (available at www.amkor.com/go/TSV on Jul. 4, 2013).

"3D-IC & TSV Interconnects.2010 Reports" (Yole Developpement).

"Ring Oscillator" (Wikipedia Mar. 14, 2013).

"TSV Through Silicon Via Technology for 3D Package Integration" (A *STAR Institute of Microelectronics).

Dec. 17, 2014 Transmittal of International Search Report and Written Opinion of the International Searching Authority for PCT/IB2014/063921.

* cited by examiner

DETECTION OF DISASSEMBLY OF MULTI-DIE CHIP ASSEMBLIES

FIELD OF THE INVENTION

The present invention relates to three dimensional and multi-die chip assemblies, and more specifically, to security features in three dimensional and multi-die chip assemblies.

BACKGROUND OF THE INVENTION

The following documents are believed to reflect the state of the art:

Amkor Technologies 3D—Through Silicon Via (TSV) Wafer Finishing and Flip Chip Stacking Solutions is described in a document available on the World Wide Web at www.amkor.com/go/TSV.

Hardware Trust Implications of 3-D Integration, WESS'10 (Workshop on Embedded Systems Security), Huffmire, et al., Oct. 24, 2010.

Improving the Quality of a Physical Unclonable Function Using Configurable Ring Oscillators, A. Maiti and P. Schaumont, International Conference on Field Programmable Logic and Applications, 2009. FPL 2009.

Physical Unclonable Functions for Device Authentication and Secret Key Generation, E. Suh and S. Devadas, DAC 2007, Jun. 4-8, 2007.

U.S. 2007083767, Apparatus and Method for Detecting Falsification of External Data, of Kumamoto, describes an external data falsification detecting system including a data acquirer section configured to acquire an external data at a time of system start and during system operation. A normal hash value of the external data is previously stored in a storage unit. A comparator section calculates a hash value of the acquired external data, compares the normal hash value and the calculated hash value, and determines that the external data was falsified such that a predetermined operation limitation is carried out, when the normal hash value and the calculated hash value are not coincident with each other.

WO2011086051, Integrated Silicon Circuit Comprising A Physically Non-Reproducible Function, And Method And System For Testing Such A Circuit, of Inst. Telecom Paris Tech., describes an integrated silicon circuit that comprises a physically non-reproducible LPUF function enabling the generation of a signature specific to said circuit. Said function comprises a ring oscillator consisting of a loop through which a signal flows, said loop consisting of N topologically identical delay channels, connected to each other in series and an inversion gate, wherein a delay channel consists of M lag elements connected to each other in series. The function also comprises a control module that generates N control words (C1, C2), said words being used for configuring the value of the lag inserted by the delay channels on the signal flowing therethrough. A measuring module measures the signal frequency at the output of the last delay channel after updating the control words, and means for deriving the measurements of the frequencies of the bits forming the circuit signature.

EP 2320344, Key Generation, of the Massachusetts Institute of Technology, describes a chip and a method is provided for operating a chip to generate and use a secret key to decrypt contents of a memory, wherein the method comprises: receiving at a PUF circuit in the chip a challenge stored on the chip; outputting from the PUF circuit a k-bit response; combining in the chip the k-bit response with the content of fuses to produce a key; and receiving the key at a decrypter and decrypting contents of a memory in the chip.

SUMMARY OF THE INVENTION

The present invention, in certain embodiments thereof, seeks to provide an improved multi-die chip assembly having at least one detection apparatus which detects manipulations of the multi-die chip assembly.

There is thus provided in accordance with an embodiment of the present invention a multi-die chip assembly including at least one detection apparatus which detects manipulations of the multi-die chip assembly, the detection apparatus including a distributed circuit including a circuit whose elements are distributed among those dies which include the elements of a local reference circuit, the distributed circuit including a free running clock, at least one local reference circuit disposed in at least one die of the multi-die chip assembly, each of the local reference circuits including a free running clock, and at least one non-volatile memory, in which is stored during manufacture of the multi-die chip assembly, an allowed range of a result of a function having at least two arguments for each reference circuit a value of the frequency of the local reference circuit as manufactured, and a value of the frequency of the distributed circuit as manufactured, at least one element of the plurality of memories being disposed in each die including the elements of the local reference circuit.

Further in accordance with an embodiment of the invention the multi-die chip assembly includes a three-dimensional chip assembly.

Still further in accordance with an embodiment of the invention including a trigger which triggers an action within the multi-die chip assembly, if the result of a calculation of a value of a function is outside of the allowed range of the stored result of the function, the calculation of the function having at least two arguments for each reference circuit the present value of the frequency of the distributed circuit, and the present value of the frequency of the local reference circuits, wherein the calculated value is calculated using the same function as the function described above.

Additionally in accordance with an embodiment of the invention the triggered action includes a punitive action.

Moreover in accordance with an embodiment of the invention the punitive action includes erasure of memory locations in at least one of RAM or flash memory.

Further in accordance with an embodiment of the invention the punitive action includes stopping of at least one activity being performed by the multi-die chip assembly.

Still further in accordance with an embodiment of the invention the punitive action includes notifying at least one of the operating system, the software, the user, that suspicious activities are presently in progress.

Additionally in accordance with an embodiment of the invention the distributed circuit and the local reference circuit include ring oscillator circuits.

Moreover in accordance with an embodiment of the invention the distributed circuit and the local reference circuit include delay lines.

Further in accordance with an embodiment of the invention the distributed circuit includes a variant number of elements, and the number of elements in the distributed circuit is controlled by control circuit embedded in each die, thereby forcing the frequency of the distributed circuit to change accordingly.

Still further in accordance with an embodiment of the invention each possible variant number of elements has a corresponding threshold value used when determining if the result of the calculation of the function exceeds an allowed tolerance.

Additionally in accordance with an embodiment of the invention each memory of the plurality of memories in which the result of the function is stored includes one-time programmable memory.

Moreover in accordance with an embodiment of the invention the function is calculated at any one of a regular interval, a random interval, and when an attempt to access secret information occurs.

Further in accordance with an embodiment of the invention the allowed threshold is determined to within an acceptable tolerance.

Still further in accordance with an embodiment of the invention the acceptable tolerance is determined according to a design analysis of the multi-die chip.

Additionally in accordance with an embodiment of the invention the tolerance is on component values.

Moreover in accordance with an embodiment of the invention the tolerance is on in-die temperature sensitivity.

Further in accordance with an embodiment of the invention the action triggered within the multi-die chip assembly includes separate actions within each die.

There is thus provided in accordance with another embodiment of the present invention a method for assembling a multi-die chip assembly including at least one detection apparatus which detects manipulations of the multi-die chip assembly, the method including disposing elements of a distributed circuit among those dies which include the elements of a local reference circuit, the distributed circuit including a free running clock, disposing at least one local reference circuit in at least one die of the multi-die chip assembly, each of the local reference circuits including a free running clock, and storing in at least one non-volatile memory, during manufacture of the multi-die chip assembly, an allowed range of a result of a function having at least two arguments for each reference circuit a value of the frequency of the local reference circuit as manufactured, and a value of the frequency of the distributed circuit as manufactured, at least one element of the plurality of memories being disposed in each die including the elements of the local reference circuit.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1A:
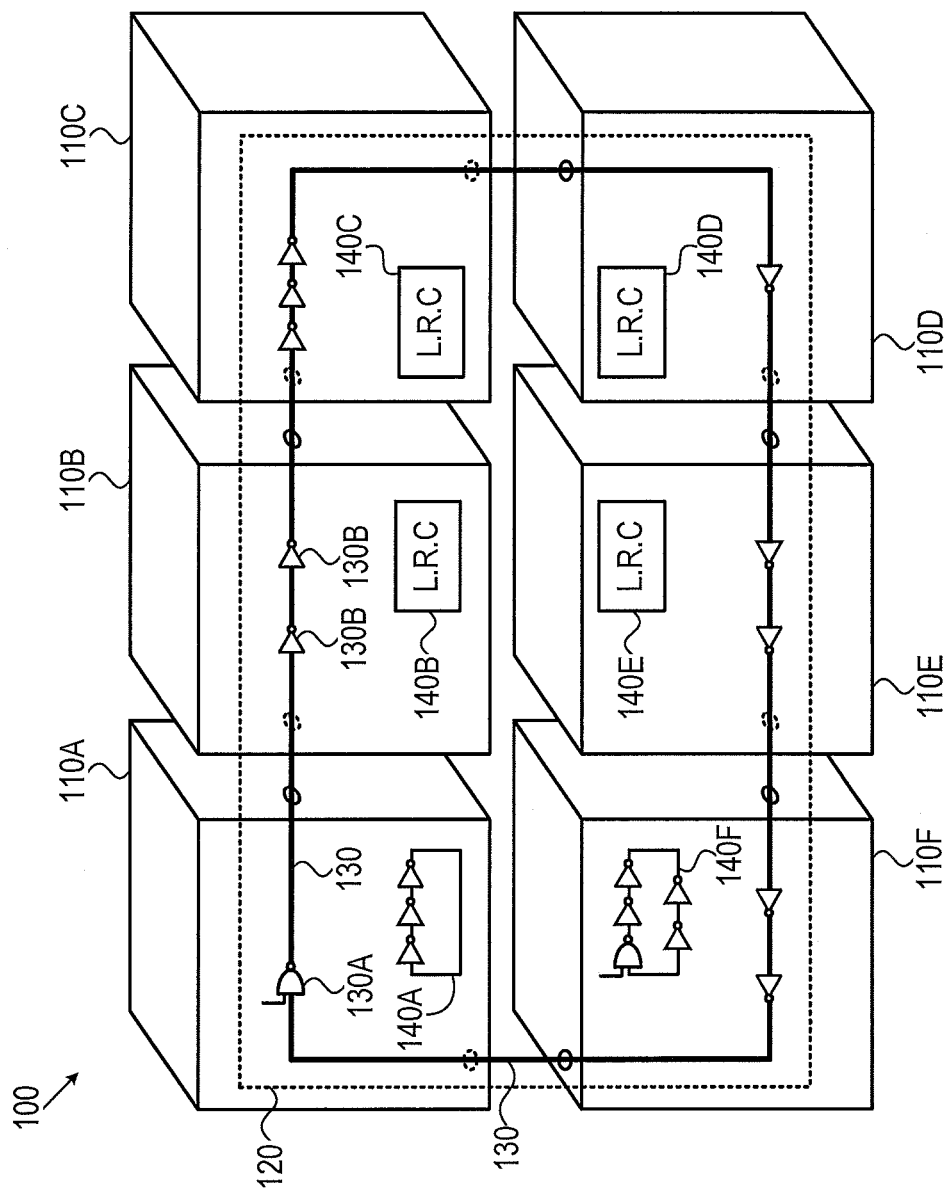
FIG. 1A is a depiction of a multi-die chip assembly constructed and operative in accordance with an embodiment of the present invention.

Reference is made to FIG. 1A which is a depiction of a multi-die chip assembly 100 constructed and operative in accordance with an embodiment of the present invention. It is appreciated that while the term "multi-die chip assembly" is used in the present description, the present invention may be implemented in a "three dimensional chip assembly".

The multi-die chip assembly 100 of FIG. 1A comprises a plurality of dies 110A, 110B, 110C, 110D, 110E, 110F, each die of the plurality of dies 110A, 110B, 110C, 110D, 110E, 110F comprising a small block of semiconducting material on which a given circuit is fabricated. In multi-die chip packaging/assembly technology, two or more dies (for instance, the plurality of dies 110A, 110B, 110C, 110D, 110E, 110F) are assembled together and are packaged to form a single integrated circuit for some system assembly. In such an integrated circuit, a secure module, such as a secure module found in many set top boxes (STBs) and personal video recorders (PVRs) may be embedded in at least one of the plurality of dies 110A, 110B, 110C, 110D, 110E, 110F.

For ease of depiction, other standard elements found in typical multi-die chip assemblies (such as multi-die chip assembly 100), which are known in the art, are not depicted in FIG. 1A.

As a security measure, in such a case, where a secure module is embedded in one of the plurality of dies 110A, 110B, 110C, 110D, 110E, 110F, the secure module is often embedded in one of the "inner dies" (i.e. one of the dies not on the outer layer of the multi-die chip assembly 100) so that probing (either with contact or contactless probing) is not feasible.

Figure 1B:
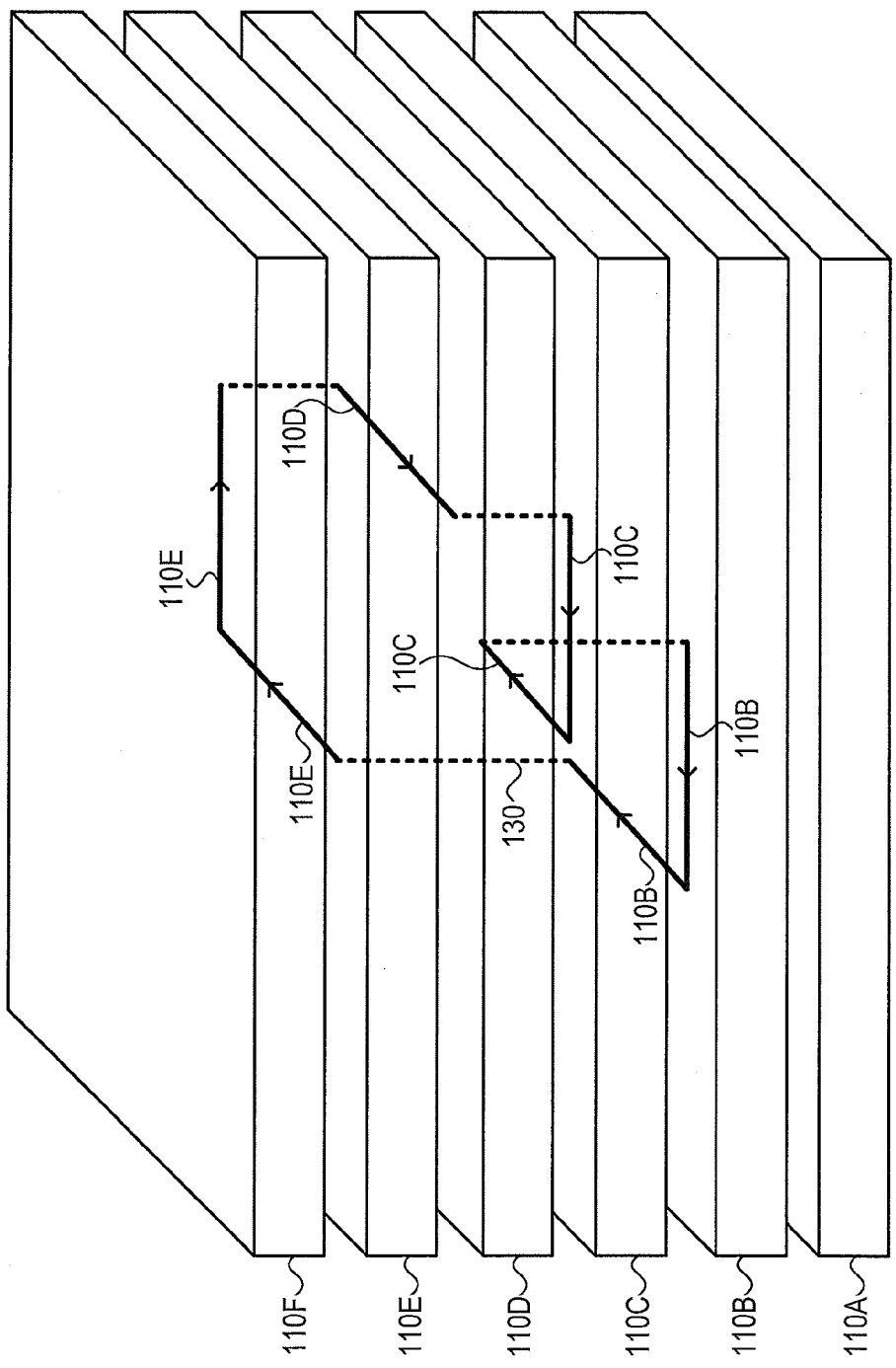
FIG. 1B is a depiction of a plurality of dies in the multi-die chip assembly of FIG. 1A in a stacked configuration.

Reference is now additionally made to FIG. 1B. FIG. 1B shows the plurality of dies 110A, 110B, 110C, 110D, 110E, 110F in a stacked configuration. Although not depicted in full detail, distributed circuit 130 is shown passing through the stack of the dies 110A, 110B, 110C, 110D, 110E, 110F. Other elements depicted in FIG. 1A do not appear in FIG. 1B, for ease of depiction. Those skilled in the art will appreciate that the depiction of the plurality of dies 110A, 110B, 110C, 110D, 110E, 110F is merely meant to be illustrative, and in no way to be limiting. In FIG. 1B, the depiction of distributed circuit 130 is intended to convey that the distributed circuit 130 will very likely not follow a straight path (as opposed to how it is depicted in FIG. 1A). The indications of 110B, 110E, 110D, and 110C shown along the distributed circuit 130 in FIG. 1B are intended to indicate through which of the various dies of the stack of dies 110A, 110B, 110C, 110D, 110E, 110F different portions of the distributed circuit 130 is passing at any given point in the figure.

However, present methods of debugging procedure flow (i.e. failure analysis) include disassembly of the die stack, and then reassembly of the dies in a form that allows access to each individual die of the plurality of dies 110A, 110B, 110C, 110D, 110E, 110F. Those of skill in the art will appreciate that a three-dimensional chip assembly having such an assembly form would entail reassembling the plurality of dies 110A, 110B, 110C, 110D, 110E, 110F in either a two- or a three-dimensional format using an interposer.

An attacker would be able to use the same procedure in order to disassemble the multi-die chip assembly 100 comprising the plurality of dies 110A, 110B, 110C, 110D, 110E, 110F and then gain access to the secure module.

Accordingly, a detection apparatus 120 is included in the multi-die chip assembly 100. The detection apparatus 120 comprises a distributed circuit 130 and a plurality of local reference circuits (LRC) 140A, 140B, 140C, 140D, 140E, 140F, as will be explained below, and one or more decision elements, which will be described below, with reference to FIG. 2A. Although the multi-die chip assembly 100 is depicted in FIG. 1A as comprising six dies in the plurality of dies 110A, 110B, 110C, 110D, 110E, 110F, all of which are depicted as comprising elements of the detection apparatus 120 (i.e. elements of the distributed circuit 130 and the plurality of LRCs 140A, 140B, 140C, 140D, 140E, 140F), it is appreciated that in practice, not all of the dies of the multi-die chip assembly 100 need to have elements of the detection apparatus 120. Typically, there may only be elements of the detection apparatus 120 comprised in dies in which secret information is comprised.

The distributed circuit 130 is arranged such that if the plurality of dies 110A, 110B, 110C, 110D, 110E, 110F (i.e. the multi-die chip assembly 100) were to be disassembled and then reconstructed in a manner which is not substantially exactly the same as the original configuration of the multi-die chip assembly 100, the distributed circuit 130, which could be a ring oscillator, a delay line, etc., properties will change from those circuit properties which it had prior to the disassembly of the multi-die chip assembly 100. Examples of such circuit properties are: frequency of a free-running oscillator, delay of a delay line (by way of example, ring oscillators will be used in this description).

The distributed circuit 130 comprises a free running oscillator, disposed so that each die of the plurality of dies 110A, 110B, 110C, 110D, 110E, 110F comprises at least one element of the distributed circuit 130, if that die 110A, 110B, 110C, 110D, 110E, 110F is a die in which one of the local reference circuits 140A, 140B, 140C, 140D, 140E, 140F is also disposed.

However, distributed circuit 130 is sensitive not only to side effects of disassembly, but to changes in silicon properties known as PVT (Process, Voltage, and Temperature). Therefore, detection apparatus 120 is constructed so that such effects are neutralized by inclusion of "reference" elements which are affected by the same voltage and temperature in the same or very similar way as distributed circuit 130. However, the reference elements are insensitive to circuit element capacitance, and interconnect resistance etc. which affect distributed circuit 130 as a result of moving the dies apart and or inexactly reassembling the dies. Thus, in addition to elements of the distributed circuit 130 being disposed in the plurality of dies 110A, 110B, 110C, 110D, 110E, 110F, each die of the plurality of dies 110A, 110B, 110C, 110D, 110E, 110F which comprises an element of the detection apparatus 120 (depicted as being surrounded by a dotted line) accordingly also comprises at least one of the of, local reference circuits 140A, 140B, 140C, 140D, 140E, 140F. The local reference circuits 140A, 140B, 140C, 140D, 140E, 140F are designed such that they have the same PVT as the elements of the distributed circuit 130. A relationship between the distributed circuit 130 and the local reference circuits 140A, 140B, 140C, 140D, 140E, 140F can be established at design or measured during chip production, and—if necessary due to production variations—data indicating the relationship can be securely stored in an on-chip non-volatile memory (NVM) to be used during the process of detecting if tampering has occurred in the multi-die chip assembly 100. A method for establishing the relationship between the distributed circuit 130 and the local reference circuits 140A, 140B, 140C, 140D, 140E, 140F is described below, with reference to FIG. 2B.

Each of the local reference circuits 140A, 140B, 140C, 140D, 140E, 140F also comprises a free running oscillator (by way of example, a ring oscillator or a delay line, which is implemented within each die of the plurality of dies 110A, 110B, 110C, 110D, 110E, 110F. Each of the local reference circuits 140A, 140B, 140C, 140D, 140E, 140F constitutes a reference free running oscillator whose frequency depends on the PVT within the die of the plurality of dies 110A, 110B, 110C, 110D, 110E, 110F in which the local reference circuit 140A, 140B, 140C, 140D, 140E, 140F is implemented.

Typically, each of the local reference circuits 140A, 140B, 140C, 140D, 140E, 140F will be designed to be similar to the distributed circuit 130. Namely, since there are several different types of inverters (or, for that matter, any other type of gate), one might be optimized for low power/low fanout, another might allow higher power, still another type of inverter may be optimized for a faster response. Since each of the local reference circuits 140A, 140B, 140C, 140D, 140E, 140F is disposed in different dies of the plurality of dies 110A, 110B, 110C, 110D, 110E, 110F, and each of the different dies may have different PVT characteristics, it is preferable to use either the same, or a very similar selection of circuit elements in the design of the distributed circuit 130 and the design of the local reference circuits 140A, 140B, 140C, 140D, 140E, 140F.

By way of example, die 110B is depicted as comprising two inverters 130B which are elements of the distributed circuit 130. Die 110B also comprises local reference circuit (LRC) 140B. Likewise, die 110A comprises local reference circuit 140A. Die 110A is depicted as comprising a NAND gate 130A which is an element in the distributed circuit 130. It is appreciated that in actual practice, the number of elements disposed in distributed circuit 130 and local reference circuit 140A, 140B, 140C, 140D, 140E, 140F in each die may be quite large and may include a NAND gate or any other appropriate circuit element, such as, and without limiting the generality of the foregoing, non-inverting amplifiers.

The distributed circuit 130 is designed and implemented such that it comprises a ring structure generating a free running clock signal. Accordingly, the frequency of the distributed circuit 130 depends on:

the actual physical electrical properties derived from the multi-die chip assembly 100 and a die interconnect between the parts of the multi-die chip assembly 100; and the same operating conditions (i.e. PVT) as do the local reference circuits 140A, 140B, 140C, 140D, 140E, 140F; and In the case that production variations affect the relationship between the characteristics of the distributed circuit 130 and local reference circuits 140A, 140B, 140C, 140D, 140E, 140F, then as one of the last steps of the process in which the multi-die chip assembly 100 is manufactured, for each die of the plurality of dies 110A, 110B, 110C, 110D, 110E, 110F comprising one of the local reference circuits 140A, 140B, 140C, 140D, 140E, 140F, a result of a function of:

the initial value of the frequency of the local reference circuit 140A, 140B, 140C, 140D, 140E, 140F as manufactured, comprised in that die; and the value of the frequency of the distributed circuit 130 is stored, for instance, in NVM. The NVM should be local or the data may be securely distributed (encrypted, signed etc.) during operation. Alternatively, one die comprises NVM that stores the initial value of the frequency of all of the distributed circuits 130 from all dies on same mounted chip.

One example of such a function is to take the ratio between the initial value of the 140A, 140B, 140C, 140D, 140E, 140F and the initial value of the frequency of the distributed circuit 130. Alternatively, other functions may be used, such as a correlation table/matrix that is pre-calibrated for PVT changes across in-and-out-of-spec range of environments may be stored in memory and consulted as needed.

Figure 2A:
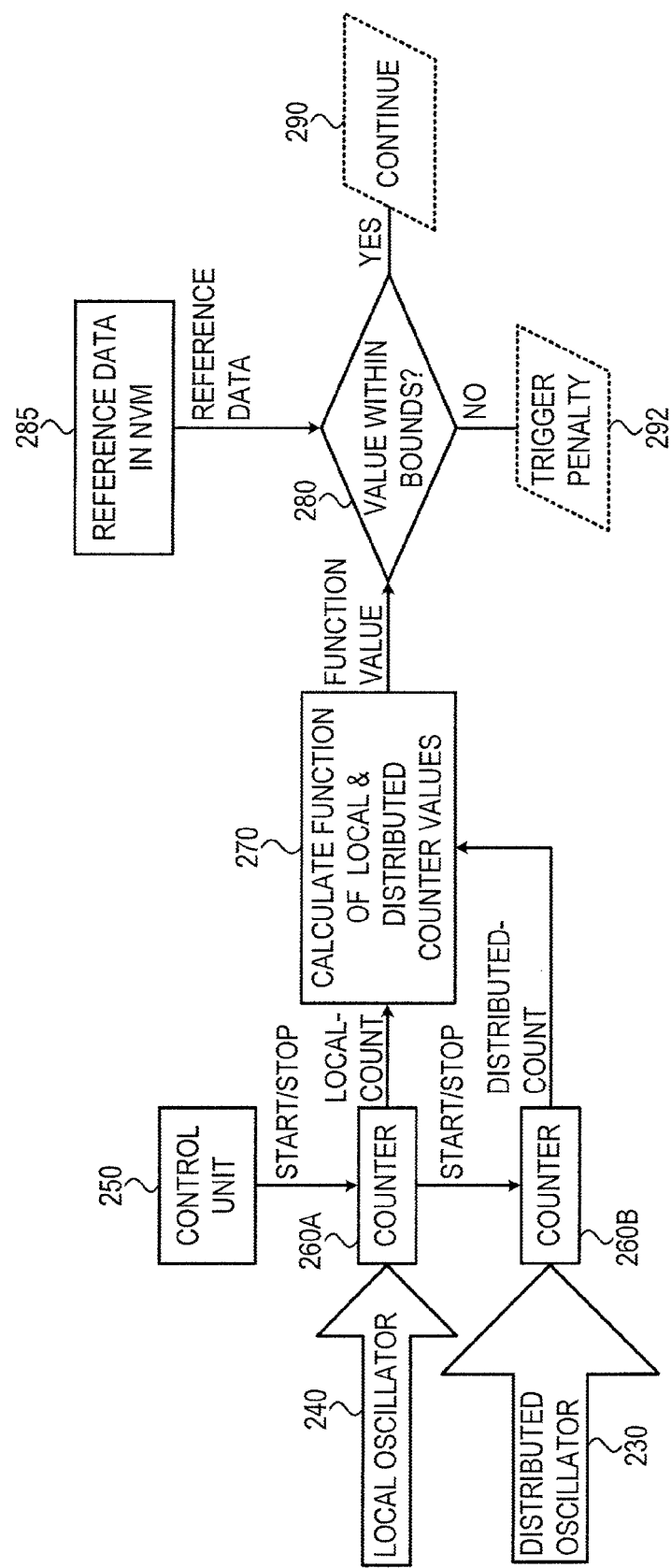
FIG. 2A is a block diagram depicting operation of a circuit incorporating the distributed circuit, at least one of the local reference circuits, of FIG. 1A, as well as decision and control elements.

Reference is now additionally made to FIG. 2A, which is a block diagram depicting operation of a circuit incorporating the distributed circuit 130, at least one of the local reference circuits 140A, 140B, 140C, 140D, 140E, 140F, of FIG. 1A, as well as decision and control elements. Those skilled in the art will appreciate that FIG. 2A depicts one of many possible circuits implementing the embodiment of the present invention as described above. A distributed oscillator 230 in FIG. 2A corresponds to the distributed circuit 130 of FIG. 1A. Likewise, a local oscillator 240 corresponds to at least one of the local reference circuits 140A, 140B, 140C, 140D, 140E, 140F, of FIG. 1A.

A control unit 250 generates a 'start' command to both of counters 260A and 260B, which count the number of clock cycles of the distributed oscillator 230 and the local oscillator 240 till a 'stop' command arrives from the control unit 250. In this particular example, a function is calculated 270 utilizing the value of the two counters 260A and 260B. It is appreciated that choice of frequency, in order to provide enough resolution (and to prevent aliasing) will be technology dependent.

The result of the function 270 is compared 280 with a stored reference value of the function 285. The stored reference value of the function 285 is determined and is stored either during design, or, more typically, during production. If the result of the comparison 280 is within an acceptable tolerance of the stored reference value of the function 285, then operation of the multi-die chip assembly 100 may continue 290. If, however, the result of the comparison 280 is not within an acceptable tolerance of the stored reference value of the function 285, then a penalty 292 is triggered, as discussed below, and the operation of the multi-die chip assembly 100 may be affected as described below.

More generally, the circuit described in FIG. 2A is depicted comprising a decision element (the calculation of the ratio which are then compared and evaluated). It is appreciated that the decision element may comprise an optionally distributed decision element (i.e. different elements which comprise the decision element may be disposed in different dies of the plurality of dies 110A, 110B, 110C, 110D, 110E, 110F). It is also further appreciated that the decision element may comprise a triggering element, as will be described below. The decision element reads the value of at least one property of the distributed circuit 130 and the value of the corresponding at least one property of at least one of the local reference circuits 140A, 140B, 140C, 140D, 140E, 140F, and computes a result of a function of the two values. The result of the function of the two values is then compared to one of a fixed allowed range;
    the stored relationship between the distributed circuit 130 and the at least one of the local reference circuits 140A, 140B, 140C, 140D, 140E, 140F plus or minus fixed tolerances (it is noted that in this case the values stored in NVM is nominal and comprises allowed tolerances, which are not necessarily symmetric); and
    lower and upper bound based on a range surrounding the stored relationship between the distributed circuit 130 and the at least one of the local reference circuits 140A, 140B, 140C, 140D, 140E, 140F.

As will be discussed below, the decision element may put a punitive action into effect in the multi-die chip assembly 100 if the result of the function of the two values is not in accordance with one of the options described immediately above.

Once the multi-die chip assembly 100 is incorporated into an operational system, the result of the function may be calculated and assessed at any or all of: a regular interval; a random interval; and when an attempt to access secret information stored in the multi-die chip assembly 100 occurs.

Should the result of the function using the present value of the frequency of the local reference circuits; and the present value of the frequency of the distributed circuit be outside an allowable tolerance, then a punitive action is triggered within the multi-die chip assembly 100. For example, and without limiting the generality of the foregoing, the multi-die chip assembly 100 may be reset or its proper operation otherwise disabled. Alternatively, memory locations in RAM or flash may be erased, execution of all or just sensitive activities may be stopped, or the operating system/software/user may be alerted that suspicious activities are presently in progress.

Those skilled in the art will appreciate that while the local reference circuits 140A, 140B, 140C, 140D, 140E, 140F and the distributed circuit 130 are depicted as comprising particular combinations of inverters and NAND gates, and any other appropriate active or passive devices as are typically implemented in integrated circuits, any appropriately constructed free running oscillator may, in fact, be used.

Figure 2B:
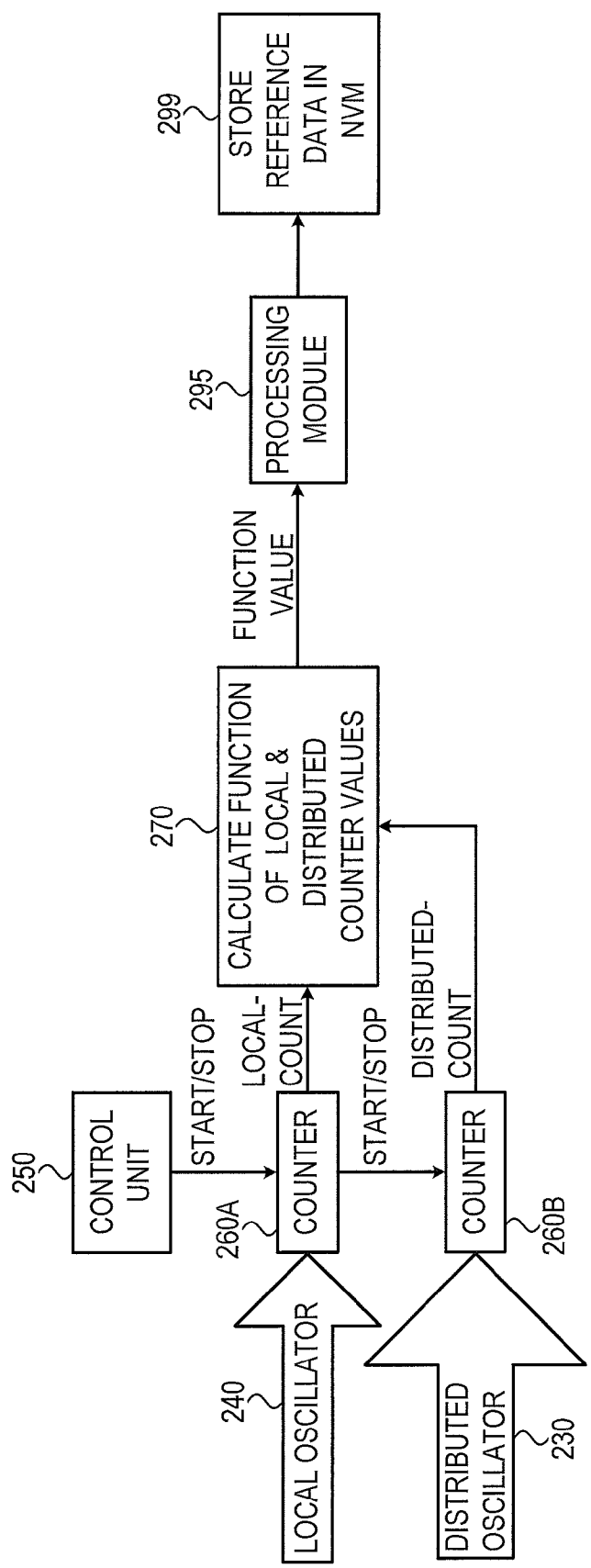
FIG. 2B is a block diagram depicting a method for establishing a relationship between the distributed circuit and the at least one of the local reference circuits, of FIG. 1A.

Reference is now made to FIG. 2B, which is a block diagram depicting a method for establishing a relationship between the distributed circuit 130 and the at least one of the local reference circuits 140A, 140B, 140C, 140D, 140E, 140F, of FIG. 1A. As was mentioned above, the relationship between the distributed circuit 130 and the local reference circuits 140A, 140B, 140C, 140D, 140E, 140F can be established at design or measured during chip production, and—if necessary due to production variations—data indicating the relationship can be securely stored in an on-chip non-volatile memory (NVM) to be used during the process of detecting if tampering has occurred in the multi-die chip assembly 100. FIG. 2B shows such a method. It will be noticed that FIG. 2B is the same as FIG. 2A, however once the function is calculated 270 utilizing the value of the two counters 260A and 260B the reference data is input to a processing module 295. The processing module 295 receives a single piece of data from the calculation 270 of the function of the local 260A and distributed 260B counters. However, as was discussed above, the result of the calculation 270 is typically stored: as an allowable range; with tolerances; or as an upper or lower bound. Accordingly, further processing is needed once the calculation 270 produces a result. The output(s) of the processing module 295 (which may be inside the chip, outside the chip, or both, and may accept other inputs) is (are) stored in NVM 299. The reference data stored in NVM 299 becomes the reference data in NVM when executing the method of FIG. 2A.

Alternatively, the process described in FIG. 2B may be run twice—once at high temperature and once at low temperature, and both of the results may be stored. Still further alternatively, the value which is the result of the calculation 270 may be delivered outside the chip, processed to arrive at the desired tolerances, and then stored in the NVM 299. It is appreciated that an external input/output may optionally be added to the processing module 295 to enable this.

Figure 3:
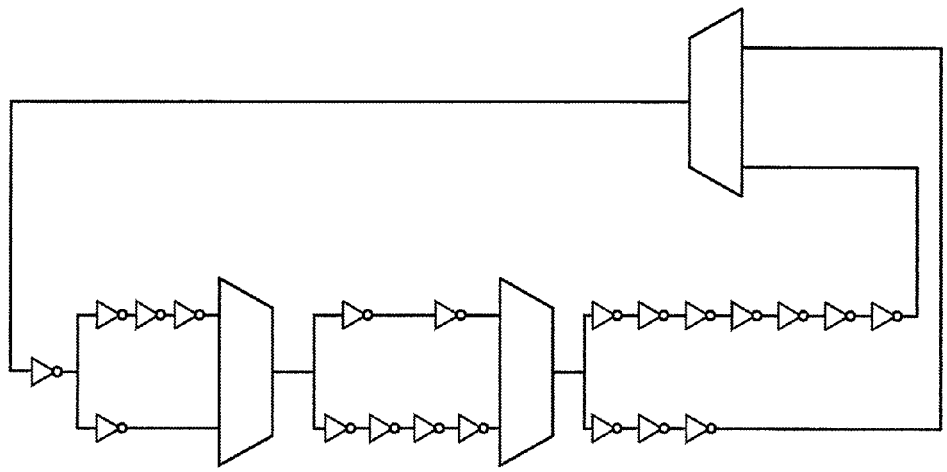
FIG. 3 is a diagram of an embodiment of a variable length free running oscillator for use in an alternative embodiment of the system of FIG. 1A.

In still another aspect of the invention, the length of the oscillator (for example, the number of inverters/NAND gates) in the distributed circuit 130 and the local reference circuits 140A, 140B, 140C, 140D, 140E, 140F is variant. Reference is now made to FIG. 3, which is a diagram of an embodiment of a variable length free running oscillator for use in an alternative embodiment of the system of FIG. 1A. A circuit such as a free running oscillator may be implemented in the distributed circuit 130 and optionally the local reference circuits 140A, 140B, 140C, 140D, 140E, 140F, so that the rings of inverters used to generate the oscillations have variable number of elements, and hence variable value of the frequency of the distributed oscillator (and optionally, the local reference circuit 140A, 140B, 140C, 140D, 140E, 140F)

It is appreciated that the primary variability is in the distributed circuit 130, thereby making a "forced-frequency" attack more difficult. In such a case, the allowed range of the value of the function. This may be treated in one of three ways:

a) storing extra sets of values in NVM;
b) changing function parameters using selector multiplexers;
c) changing the frequencies of the local oscillators in step with the change of the distributed circuit 130.

When such variations are used, care must be taken to prevent a "false alarm" due to a mismatch between the characteristics of distributed circuit 130 and the local reference circuits 140A, 140B, 140C, 140D, 140E, 140F elements. False alarm prevention may be achieved by making coordinated variations in distributed circuit 130 and the local reference circuits 140A, 140B, 140C, 140D, 140E, 140F, or by concurrently varying the values of the "comparison range" values for decision element(s).

The variations may be periodic, timed in a random or pseudo-random manner, or event-triggered. Selection and implementation of control strategy will be appreciated by persons who are skilled in the art.

Figure 4:
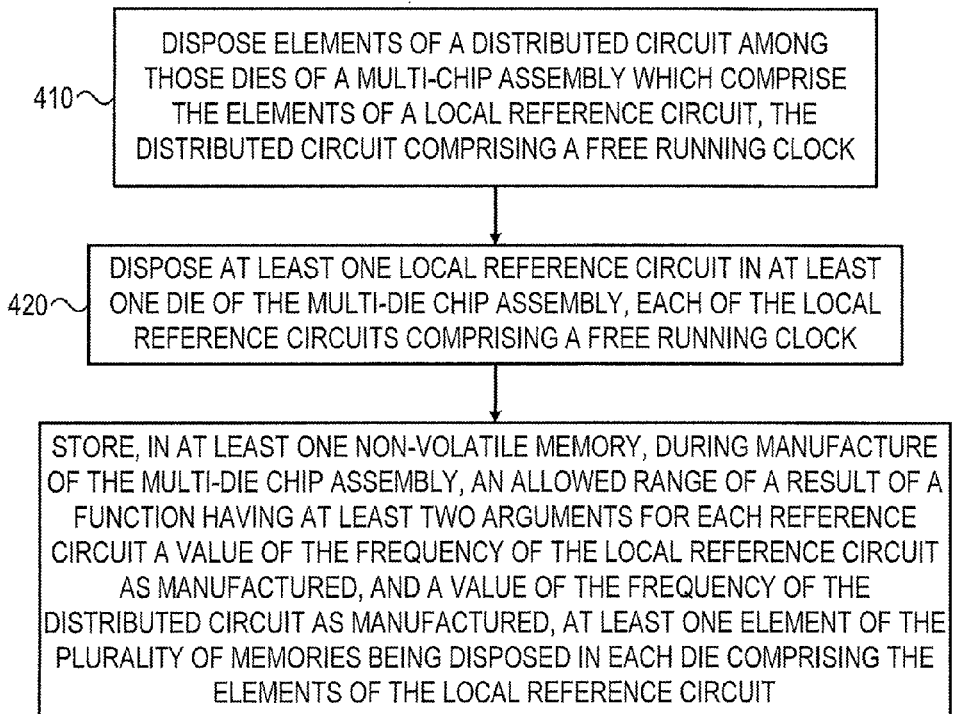
FIG. 4 is a flowchart of one method for assembling the multi-die chip assembly of FIG. 1A.

Reference is now made to FIG. 4, which is a flowchart of one method for assembling the multi-die chip assembly of FIG. 1A. Elements of a distributed circuit are disposed among those dies of a multi-chip assembly which comprise the elements of a local reference circuit, the distributed circuit comprising a free running clock (step 410). At least one local reference circuit is disposed in at least one die of the multi-die chip assembly, each of the local reference circuits comprising a free running clock (step 420). During manufacture of the multi-die chip assembly, an allowed range of a result of a function having at least two arguments for each reference circuit is stored, the two arguments being:

a value of the frequency of the local reference circuit as manufactured; and
a value of the frequency of the distributed circuit as manufactured.

At least one element of the plurality of memories is disposed in each die comprising the elements of the local reference circuit (step 430).

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A multi-die chip assembly comprising a plurality of dies, the multi-die chip assembly further comprising:
at least one detection apparatus which detects manipulations of the multi-die chip assembly, the at least one detection apparatus comprising:
a distributed reference circuit comprising a single circuit, the single circuit comprising a plurality of elements, the plurality of elements being distributed among the plurality of dies, the single circuit comprising a first free running clock;
at least one local reference circuit disposed wholly in at least one of the plurality of dies of the multi-die chip assembly, each of the at least one local reference circuit comprising a local free running clock; and
at least one non-volatile memory, in which is stored during manufacture of the multi-die chip assembly, an allowed range of a result of a calibration application of a function having at least two arguments for each of the at least one local reference circuit, the at least two arguments comprising:
a value of a frequency of the at least one local reference circuit as manufactured; and
a value of a frequency of the distributed reference circuit comprising a single circuit as manufactured,
wherein at least one element of the plurality of elements being disposed in each one of the plurality of dies comprising at least one of the at least one local reference circuit.

2. The multi-die chip assembly of claim 1 wherein the multi-die chip assembly comprises a three-dimensional chip assembly.

3. The multi-die chip assembly of claim 1 and further comprising a trigger which triggers an action within the multi-die chip assembly, if for at least one of the at least one local reference circuit a result of a comparison application of the function having at least two arguments is outside of the stored allowed range of the result of the calibration application of the function for the at least one of the at least one local reference circuit, the at least two arguments of the comparison application of the function comprising:
a present value of the frequency of the distributed reference circuit; and
a present value of the frequency of the at least one of the at least one local reference circuit.

4. The multi-die chip assembly according to claim 3 wherein the action triggered within the multi-die chip assembly comprises separate actions within each of the plurality of dies.

5. The multi-die chip assembly according to claim 3 wherein the triggered action comprises a punitive action.

6. The multi-die chip assembly of claim 5 wherein the punitive action comprises erasure of memory locations in at least one of RAM or flash memory.

7. The multi-die chip assembly of claim 5 wherein the punitive action comprises stopping of at least one activity being performed by the multi-die chip assembly.

8. The multi-die chip assembly of claim 5 wherein the punitive action comprises notifying at least one of:
an operating system;
a software application;
a user,
that suspicious activities are presently in progress.

9. The multi-die chip assembly of claim 1 wherein the distributed reference circuit and the at least one local reference circuit comprise ring oscillator circuits.

10. The multi-die chip assembly of claim 1 wherein the distributed reference circuit and the at least one local reference circuit comprise delay lines.

11. The multi-die chip assembly of claim 3 wherein:
the distributed reference circuit comprises a variant number of elements, and the number of elements in the distributed reference circuit is controlled by a control circuit embedded in each of the plurality of dies, thereby forcing the frequency of the distributed reference circuit to change accordingly.

12. The multi-die chip assembly of claim 11 wherein each possible variant number of elements has a corresponding threshold value used when determining if the result of the comparison application of the function exceeds an allowed tolerance.

13. The multi-die chip according to claim 1 wherein each memory of the at least one non-volatile memories in which the result of the calibration application of the function is stored comprises one-time programmable memory.

14. The multi-die chip according to claim 3 wherein the comparison application of the function is calculated at any one of:
    a regular interval;
    a random interval; and
    when an attempt to access secret information occurs.

15. The multi-die chip according to claim 1 wherein the allowed range is determined to within an acceptable tolerance.

16. The multi-die chip according to claim 15 wherein the acceptable tolerance is determined according to a design analysis of the multi-die chip.

17. The multi-die chip according to claim 15 wherein the acceptable tolerance is on component values.

18. The multi-die chip according to claim 15 wherein the acceptable tolerance is on in-die temperature sensitivity.

19. A method for assembling a multi-die chip assembly, the multi-die chip assembly comprising a plurality of dies, and further comprising at least one detection apparatus which detects manipulations of the multi-die chip assembly, the method comprising:
    disposing elements of a single distributed reference circuit among those dies which comprise the elements of a local reference circuit, the distributed reference circuit comprising a plurality of elements including a first free running clock;
    disposing a whole at least one local reference circuit in at least one die of the plurality of dies of the multi-die chip assembly, each of the at least one local reference circuit comprising a local free running clock; and
    storing in at least one non-volatile memory, during manufacture of the multi-die chip assembly, an allowed range of a result of a calibration application of a function having at least two arguments for each of the at least one local reference circuit, the at least two arguments comprising:
        a value of a frequency of the at least one local reference circuit as manufactured; and
        a value of the frequency of the distributed reference circuit comprising a single circuit as manufactured,
        wherein at least one element of a plurality of elements being disposed in each one of the plurality of dies comprising at least one of the at least one local reference circuit.

\* \* \* \* \*